United States Patent [19]

Johnson et al.

[11] Patent Number: 4,638,868

[45] Date of Patent: Jan. 27, 1987

[54] EARTH ENGAGING IMPLEMENTS

[75] Inventors: William M. Johnson, Winchlesea; Ilmar Mere, St. Marys, both of Australia

[73] Assignee: Ralph McKay Limited, Maidstone, Australia

[21] Appl. No.: 716,624

[22] Filed: Mar. 27, 1985

[30] Foreign Application Priority Data

Mar. 30, 1984 [AU] Australia ............................ PG4343

[51] Int. Cl.$^4$ .......................................... A01B 23/02
[52] U.S. Cl. ..................................... 172/762; 172/749
[58] Field of Search ............... 172/762, 749, 751, 753

[56] References Cited

U.S. PATENT DOCUMENTS

| 2,222,071 | 11/1940 | Gustafson | 172/762 |
| 2,595,353 | 5/1952 | Graham | 172/762 |
| 2,877,061 | 3/1959 | Blackwood | 172/753 |
| 3,061,021 | 10/1962 | Shader | 172/762 X |

FOREIGN PATENT DOCUMENTS

| 6966 of 1927 | Australia | 172/762 |
| 106027 | 11/1938 | Australia . |
| 112197 | 12/1940 | Australia | 172/762 |

Primary Examiner—Richard J. Johnson
Attorney, Agent, or Firm—Christel, Bean & Linihan

[57] ABSTRACT

An earth engaging implement and tine construction comprising a tine having bolted thereto an adaptor having an upper surface externally tapered in cross section, an elongated slot extending through the adaptor to receive a bolt head, and the lower surface of the adaptor comprising a rediused portion and a flat portion. An earth engaging implement includes an earth engaging portion and an attachment portion, the attachment portion comprising a tapered socket of complementary cross sectional shape to the upper surface of the adaptor, and the earth engaging implement being secured to the adaptor by a wedging frictional grip on to the upper surface. The adaptor has an angle of inclination of the upper surface thereof when mounted on the tine which corresponds to the angle of attachment portion of the earth engaging implement when it is oriented for ground engagement.

4 Claims, 11 Drawing Figures

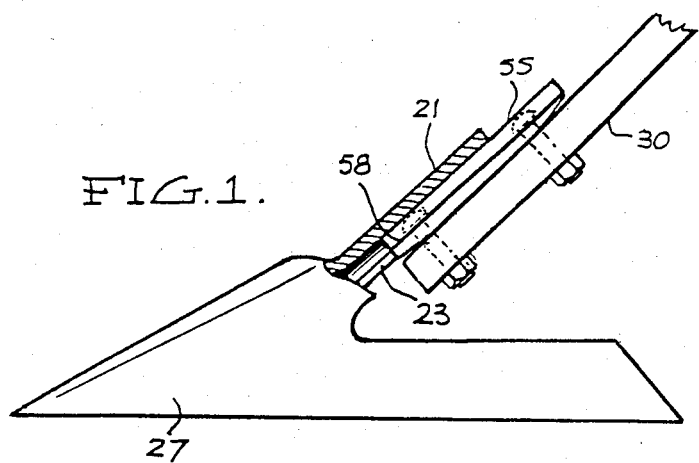
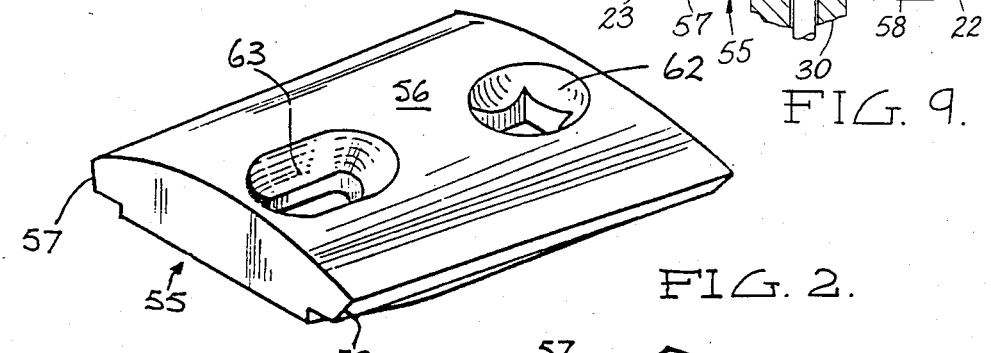
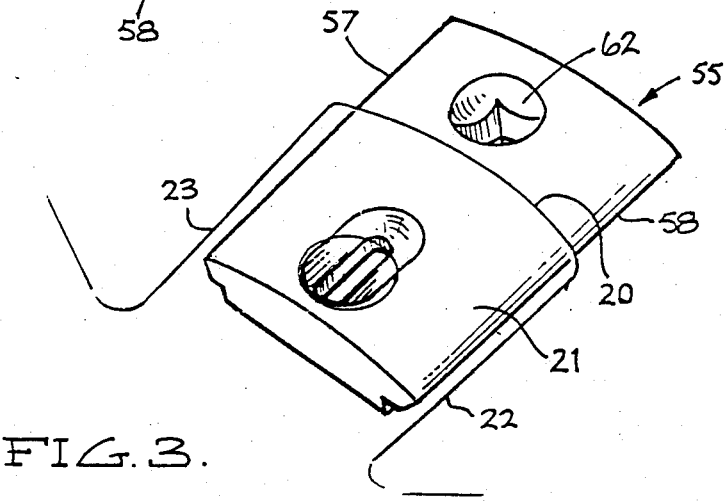

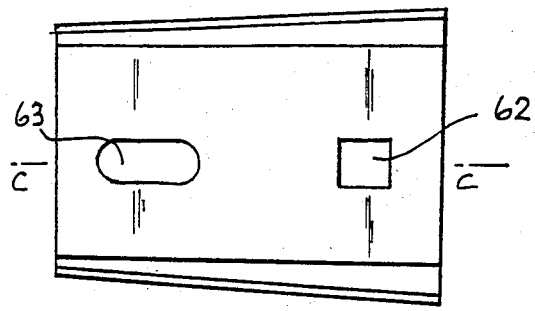
FIG. 4.
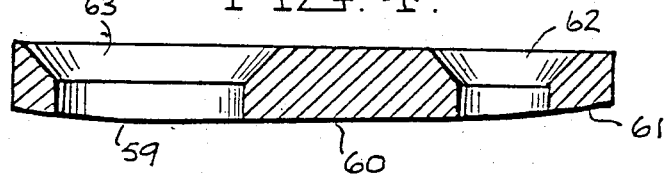
FIG. 5.
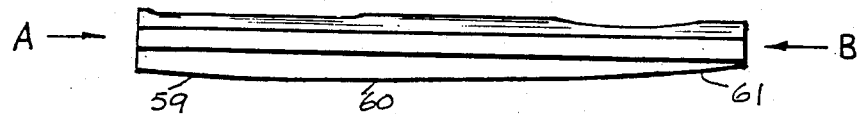
FIG. 6.
 
FIG. 6A. FIG. 6B.
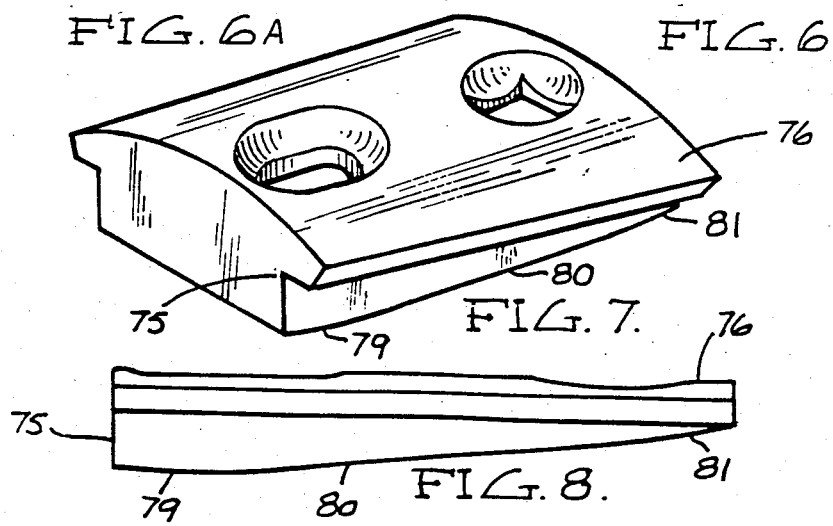
FIG. 7.
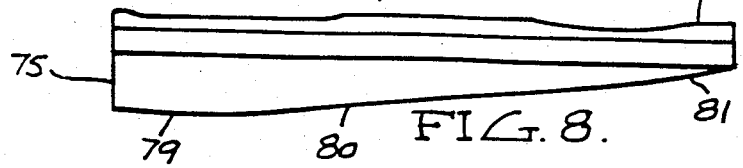
FIG. 8.

EARTH ENGAGING IMPLEMENTS

This invention relates to an improvement in agricultural implements.

Australian Pat. No. 106,027 (Marlow) discloses an implement having a tapered socket adapted to receive the base of a tine of an agricultural machine.

This arrangement does away with the need for bolt fastenings as the implement is held on by a wedging frictional grip. Marlow also disclosed the use of an adaptor to be used where the tine was of the bolt on type and which enabled the "knock-on" type of implement to be used with such tines.

Usually a separate adaptor is required for each type of tine that the implements may be used with. Some tines have a flat end while some are curved. Also the position of the bolt holes on the tines needed to lie matched in the adaptor.

Another difficulty is that tines vary as to the angle of inclination of the tine foot and conventionally earth engaging implements have their attachment portions angled to correspond to the angle of a particular tine. This makes it difficult for farmers to attach implements of a particular kind to tines of differing inclinations and thus limited as to the choice of replacement parts.

It is an object of this invention to provide an adaptor which can be used with a variety of tines.

To this end the present invention provides an earth engaging implement and tine construction comprising a tine having bolted thereto an adapter having an upper surface externally tapered in cross section, and an elongated slot extending through said adaptor adapted to receive a bolt head and the lower surface of the adaptor comprises a radiused portion and a flat portion and an earth engaging implement comprising an earth engaging portion and an attachment portion, said attachment portion comprising a tapered socket of complementary cross sectional shape to said upper surface of said adaptor, said earth engaging implement being secured to said adaptor by a wedging frictional grip on to said upper surface, said adaptor being further characterized in that the angle of inclination of the upper surface of the adaptor when mounted on the tine corresponds to the angle of the attachment portion of the earth engaging implement when it is oriented for ground engagement.

The provision in combination of a lower surface having flat and radiused sections and an elongated slot to receive a bolt results in an adaptor which can be used with a number of different tines.

By ensuring that the upper surface of the adaptor corresponds in angle to the angle of the implements attachment portion an implement can be used with any tine. This will usually mean that one end of the adaptor will be thicker than the other to provide for the differing angles between the implement and the tine.

A preferred embodiment of this invention will now be described in which:

FIG. 1 is a view of a sweep mounted on an adaptor of this invention bolted to a tine;

FIG. 2 is a perspective view of an adaptor for the sweep of FIG. 1;

FIG. 3 is a schematic view of the adaptor of FIG. 2 interfitting with the socket of the sweep of FIG. 1;

FIG. 4 is an underneath plan view of the adaptor of FIG. 2;

FIG. 5 is a sectional view along the lines C—C of FIG. 4;

FIG. 6 is a side view of the adaptor of FIG. 2; while

FIG. 6A is a view from A of FIG. 6;

FIG. 6B is a view from B of FIG. 6;

FIGS. 7 and 8 are a side elevation and perspective view of a second embodiment of this invention; and FIG. 9 is a vertical transverse sectional view of the adaptor of FIG. 2 interfitting with the socket of the sweep of FIG. 1.

FIG. 1 illustrates a sweep comprising an earth engaging portion 27 and an attachment portion 21 secured to an adaptor 55 bolted to the foot of tine 30. The attachment portion 21 is tapered in cross section as shown in FIG. 9 to receive the complementary shaped adaptor. In FIGS. 2 to 6 the adaptor 55 comprises a curved upper face 56 complementary in shape to the face of the attachment portion 21. The edge portions 57 and 58 are adapted to be encompassed by flanges 22 and 23 as shown in FIG. 9. The body of adaptor 55 is tapered as is the socket 20, toward the earth engaging portion 27. The lower surface of adaptor 55 comprises three surface portions 59, 60 and 61. If the tine is radiused at its foot, the surfaces 59 and 61 will lie snugly against it. If the surface of the tine foot is flat then surface 60 is used. The recessed bolt hole 62 is aligned with a bolt hole of the tine while the recessed slot 63 is adapted to align with a range of secondary tine bolt holes. In this way the lower surface and the bolt holes of the adaptor enable it to be used with a variety of tine types to convert them to use with the sockets of this invention.

The profile (59, 60, 61) of the mounting face of the adaptor 55 can be varied to suit the variety of tine foot angles. This means that a sweep with a standard socket angle can thus be utilized on all tines.

The adaptor of FIGS. 2 to 6 is suitable where the angle of the attachment portion of the implement corresponds to that of the tine. FIGS. 7 and 8 illustrate an embodiment where these angles do not correspond so that the angle of the upper surface 76 when the adaptor is mounted on the tine corresponds to the inclination of the attachment portion. The mounting faces 79, 80 and 81 lie on the tine and the body 75 of the adaptor is thickened to provide the necessary angle to the surface 76.

The adaptors are preferably cast and once the angles of the various attachment portions and tines are known, a series of adaptors can be designed to match any implement to any tine.

From the above it can be seen tht the present invention provides a combination of features which makes it possible to ensure that a variety of implements can be secured to a variety of tines using a wedge fitting action.

The claims defining the invention are as follows:

We claim:

1. An earth engaging implement and tine construction comprising a tine having bolted thereto an adaptor having an upper surface externally tapered in cross section, and an elongated slot extending through said adaptor adapted to receive a bolt head and the lower surface of the adaptor comprises a central flat portion and two radiused portions at either end of said central portion, and an earth engaging implement comprising an earth engaging portion and an attachment portion, said attachment portion comprising a tapered socket of complementary cross sectional shape to said upper surface of said adaptor, said earth engaging implement being secured to said adaptor by a wedging frictional grip on to said upper surface, said adaptor being further characterized in that the angle of inclination of the upper surface of the adaptor when mounted on the tine corresponds to the angle of the attachment portion of the earth engaging implement when it is oriented for ground engagement.

2. The implement and tine construction of claim 1 wherein the adaptor includes a recessed bolt hole in addition to the elongated slot recessed to receive a bolt.

3. An adaptor for an earth engaging implement and tine construction, said adaptor having an upper surface externally tapered in cross section and an elongated slot extending through said adaptor adapted to receive a bolt head, said adaptor having a lower surface comprising a central flat portion and two radiused portions at either end of said central portion, said upper surface of said adaptor being complementary in shape to the cross-sectional shape of a tapered socket of said implement, the earth engaging implement being secured to said adaptor by a wedging frictional grip on to said upper surface of said adaptor, said adaptor being further characterized in that the angle of inclination of the upper surface of the adaptor when mounted on the tine corresponds to the angle of an attachment portion of the earth engaging implement when it is oriented for ground engagement.

4. An adaptor as defined in claim 3, wherein the adaptor includes a recessed bolt hole in addition to the elongated slot recessed to receive a bolt.

* * * * *